(12) United States Patent
Clausi et al.

(10) Patent No.: US 10,086,531 B2
(45) Date of Patent: Oct. 2, 2018

(54) PROCESS FOR PRODUCING RESILIENT WOOD PARTICLEBOARD, MDF AND HDF

(76) Inventors: Robert N. Clausi, Oakville (CA); Savaltore Diloreto, Ancaster (CA)

( * ) Notice: Subject to any disclaimer, the term of this patent is extended or adjusted under 35 U.S.C. 154(b) by 202 days.

(21) Appl. No.: 12/996,652

(22) PCT Filed: Jun. 8, 2009

(86) PCT No.: PCT/CA2009/000778
§ 371 (c)(1),
(2), (4) Date: Dec. 7, 2010

(87) PCT Pub. No.: WO2010/006409
PCT Pub. Date: Jan. 21, 2010

(65) Prior Publication Data
US 2011/0073253 A1    Mar. 31, 2011

Related U.S. Application Data

(60) Provisional application No. 61/059,775, filed on Jun. 8, 2008.

(51) Int. Cl.
| | |
|---|---|
| *C04B 37/00* | (2006.01) |
| *B27N 3/00* | (2006.01) |
| *C08G 18/48* | (2006.01) |
| *C08G 18/64* | (2006.01) |
| *C08G 18/65* | (2006.01) |
| *C08G 18/76* | (2006.01) |
| *C08G 18/10* | (2006.01) |
| *C08G 18/36* | (2006.01) |

(52) U.S. Cl.
CPC ............. *B27N 3/002* (2013.01); *C08G 18/10* (2013.01); *C08G 18/36* (2013.01); *C08G 18/4825* (2013.01); *C08G 18/4841* (2013.01); *C08G 18/6492* (2013.01); *C08G 18/6547* (2013.01); *C08G 18/7664* (2013.01)

(58) Field of Classification Search
USPC .................................................. 156/296, 325
See application file for complete search history.

(56) References Cited

U.S. PATENT DOCUMENTS

| | | |
|---|---|---|
| 4,546,039 A | 10/1985 | Horacek et al. |
| 4,608,407 A | 8/1986 | Kerimis et al. |
| (Continued) | | |

FOREIGN PATENT DOCUMENTS

| | | | |
|---|---|---|---|
| EP | 0262537 | 4/1988 | |
| WO | WO 2007/095730 | * 8/2007 | ................ C08J 9/35 |

OTHER PUBLICATIONS

WO9518185(A1) Abstract, Jul. 6, 1995.
(Continued)

*Primary Examiner* — Joseph S Del Sole
*Assistant Examiner* — John Robitaille
(74) *Attorney, Agent, or Firm* — Manelli Selter PLLC; Edward J. Stemberger (57) ABSTRACT

A resilient MDF, HDF or particleboard material is prepared by pressing natural fibers, which have been pre-treated with binder which falls within the scope of the present invention, to form a fiber board material. The fiber board is a mixture of fibers, and a resin system comprising an isocyanate, and a polyol component. The resin system is selected so as to provide are resilient material that provides sound attenuating properties.

7 Claims, 8 Drawing Sheets

(56) References Cited

U.S. PATENT DOCUMENTS

| | | |
|---|---|---|
| 5,179,143 A | 1/1993 | Konig |
| 6,022,444 A | 2/2000 | Haider et al. |
| 6,051,640 A | 4/2000 | Reck et al. |
| 6,114,464 A | 9/2000 | Reck et al. |
| 6,299,936 B1 | 10/2001 | Reck et al. |
| 6,344,268 B1 * | 2/2002 | Stucky et al. ............ 428/317.9 |
| 6,348,530 B1 | 2/2002 | Reck et al. |
| 6,368,714 B1 | 4/2002 | Robertson et al. |
| 6,596,386 B1 | 7/2003 | Reck et al. |
| 6,998,078 B2 | 2/2006 | Wierer et al. |
| 2003/0212227 A1 | 11/2003 | Stroobants et al. |
| 2004/0229010 A1 * | 11/2004 | Clark .................... B27N 3/083 428/98 |

OTHER PUBLICATIONS

CN101254608(A) Abstract, Sep. 3, 2008.
JPS6227107(A) Abstact—Feb. 5, 1987.
WO9728935(A1) Abstract—Aug. 14, 1997.
DE19618271(C2) Abstract—Oct. 28, 1999.
DE4316498(C2) Abstract—Mar. 1, 2001.

* cited by examiner

PROCESS FOR PRODUCING RESILIENT WOOD PARTICLEBOARD, MDF AND HDF

CROSS REFERENCE TO RELATED APPLICATIONS

This application is derived from PCT application No. PCT/CA2009/000778, filed Jun. 8, 2009, which claimed priority to US Provisional Patent Application Nos. 61/059,775, filed Jun. 8, 2008, the entire contents of which is expressly incorporated herein by reference.

FIELD OF THE INVENTION

The invention relates to a process for producing resilient natural fiber panels by pressing particles which have been treated with a resin system binder. The natural fiber particles may be derived from wood or from other plants such as flax, jute, bamboo, sisal, rice-hulls, or the like, and the fibers are mixed with the resin system, and then pressed and optionally heated to produce fibre boards.

BACKGROUND ART

Natural fiber board panels have a variety of applications. These panels are typically described as medium density fiberboard (MDF), high density fiberboard (HDF) and particleboard. The present invention describes the manufacture of a resilient fibre board made from natural fibers. By introducing resiliency to the panels, products made from the panels have been found to offer better sound attenuation.

To produce wood particleboard, the wood particles, for example wood fibers or wood chips, are glued together by means of an organic adhesive under pressure and at elevated temperature. The most important binders for fiberboard production are urea-formaldehyde resins (UF resins). To produce moisture-resistant wood chipboards, phenol-formaldehyde resins (PF resins) are of great importance.

Melamine-formaldehyde resins (MF resins) are also used for improving the moisture resistance of wood particleboard. A disadvantage of these adhesives, however, is that formaldehyde is emitted both during production of the particleboard and during use of the finished, pressed particleboard.

MDF and HDF are also produced using polymeric isocyanate (PMDI), as a binder to achieve better moisture properties.

In one manufacturing process for medium density fiberboard (MDF) and high density fiberboard (HDF), the fibers are typically hydrothermally pretreated in a first step in a refiner unit, i.e. boiled and milled at elevated temperature under steam pressure. After milling, the fibers, while still under steam pressure and at temperatures from 120° C. to 150° C., are treated with binder by spraying an aqueous dispersion of the binder via a cooled valve into the blowline. The turbulence which occurs at a flow velocity of from 200 to 500 m/s distributes the binder uniformly over the fiber surface. Finally, the fibers which are treated with binder are dried, laid down uniformly, and pressed at temperatures of from 150 to 250° C. to produce boards.

A particularly important use of the particleboard, MDF, and/or HDF panels, is in the production of laminate flooring. As is known in the art, laminate flooring is made up of several layers typically including, for example, a decorative paper, a wear layer in melamine resin over the decorative paper, a core layer made of HDF, MDF or particleboard as a support layer, and a stabilizing layer made of paper. While the decorative paper is what gives the laminate flooring its individual appearance, the wear layer provided by the melamine resin provides a highly wear resistant material.

The core of the laminate floor, however, is provided by the core layer of particleboard, MDF and/or HDF which supports the decorative paper and the overlay.

A variety of other layers can be added to these materials, including a paper backing (or balancing layer) in order to produce laminate floors having different properties. The core layer of laminate flooring is typically produced in board form by pressing the materials together at high pressure and at high temperature.

However, a common problem of laminate flooring of the prior art, is the high sound levels measured from normal use of the flooring. Various approaches have been made to reduce the sound level including the use of a sound absorbing foam sublayer beneath the laminate floor. However, the prior art approaches do not address the real issue that the existing MDF, HDF and particleboard cores are not resilient and therefore, act to amplify the sound.

As such, typical opportunities for the resilient composite board of the present invention will include replacement for cork, acting as sound attenuating underlayment panels, linoleum replacement, and most particularly, acting as flexible and sound absorbing core materials for laminate floors or engineered wood floors, panel products for furniture and cabinetry, wall and ceiling panels and other architectural applications etc.

Accordingly, while being of some benefit, the prior art approaches can be expensive or time consuming, and as such, it would still be beneficial to provide a laminate material, and a method for the production of, a resilient core layer for use in a laminate material, which core layer provides sound attenuating properties.

SUMMARY OF THE INVENTION

Current methods for the production of MDF, HDF and particleboard produce rigid panels that have poor sound attenuation properties. It is an object of the invention to provide a process for producing wood particleboard that may be engineered for flexibility, sound attenuation properties, appearance, texture and density. Core layers produced from these sound attenuating MDF, HDF and particleboard materials, will provide laminate flooring, and other composite wood panel materials, with improved sound attenuation properties.

As such, the objectives described hereinabove with respect to the present invention, are fully or at least partially achieved by a process to produce a resilient natural fiber board comprising reacting a flexible binding system with an admixture of natural fibers, in order to produce a resilient fiber board. The resilient fiber board can then be used as a core layer in a laminate flooring material, or in other composite wood panel materials.

Preferably, the flexible binding system comprises either a single pre-reacted and/or pre-mixed binding system, or a two component binding system in which a first binder component is admixed with wood particles during an early phase of the process, and a second binder component, reactive with the first, is added subsequently, and reacted, in order to produce a resilient fiber board material, such as a resilient MDF, HDF or particleboard material.

Accordingly, the present invention provides a process for producing MDF, HDF or particle boards (or "fiber boards") by pressing natural fibers which have been pre-treated with binder which falls within the scope of the present invention. This can be provided by simple mixing of the materials and then pressing and/or heating, or in other cases, the wood fibers can be boiled and milled at elevated temperatures under steam pressure in a refiner unit, and then subsequently transferred to a blow-line, dried, and finally pressed under pressure and, if desired, at elevated temperature, in order to produce the boards of the present invention. In a preferred embodiment, the treatment with binder is carried out using a single-component pre-polymer made from, for example, PMDI (Mondur M from Bayer) reacted with a saturated polyoxy propylene glycol containing hydroxyl function groups with a preferred finished N.C.O. content of about 8%.

The single component binder is blended with the fibers and the resulting mixture is pressed, at an optionally increased temperature, to form a fiber board that can be used as a core layer.

Thus, in a first aspect, the present invention provides a method for the production of a resilient, and preferably semi-rigid or flexible, natural fiber composite fiber board material, including MDF, HDF or particleboard, comprising:
(i) providing a single-component resin system component comprising:
  (a) a polyurethane pre-polymer prepared by reacting a poly or di-isocyanate resin, with
  (b) a polyol material selected from the group consisting of:
    1. a saturated polyether polyol;
    2. an unsaturated polyether polyol;
    3. a saturated polyester polyol;
    4. an unsaturated polyester polyol;
    5. a caprolactone polyol;
    6. a butadiene polyol;
    7. a castor oil/soy or bio-based polyol; or
    8. mixtures thereof and therebetween of the above named polyol materials;
  and,
(ii) mixing said resin system component with a wood fibre component, in order to produce a composite fiber board.

In an alternative embodiment, the treatment with binder is carried out using a two-component binder, which contains functional groups which are reactive at elevated temperature.

Component b) is preferably a polyol, or a polyol-containing material, as outlined and described hereinbelow. Preferably, component a) is an isocyanate-containing material which again, will be as outlined and described hereinbelow.

The two components are blended with the fibers and the resulting mixture is pressed, at an optionally increased temperature, to form a fiber board that can be used as a core layer. By changing the ratio and composition of the a) component and the molecular weight of the polyols, the resulting fiber board, may be made more resilient, more flexible, and certainly less rigid, than prior art materials. Use of this type of core layer, provides a core layer that has sound attenuating properties when used in laminate floors, or similar pressed fiberboard materials.

The present invention also provides a method for the production of a resilient, and preferably semi-rigid or flexible, natural fiber composite fiber boards material, including MDF, HDF, or particleboard materials, comprising;
(i) providing a two component resin system comprising:
  (a) a poly or di-isocyanate resin, and
  (b) a polyol material selected from the group consisting of:
    1. a saturated polyether polyol;
    2. an unsaturated polyether polyol;
    3. a saturated polyester polyol;
    4. an unsaturated polyester polyol;
    5. a caprolactone polyol;
    6. a butadiene polyol;
    7. a castor oil/soy or bio-based polyol; or
    8. mixtures thereof and therebetween of the above named polyol materials;
  and,
(ii) mixing said resin system component with a wood fibre component, and causing said resin system to react, in order to produce a composite fiber board.

The resulting MDF, HDF or particleboard materials is preferably used as a core layer in a laminate flooring material. In these products, the resilient nature of the fiber board materials provides sound attenuating properties, while still providing sufficient strength and rigidity for use in flooring applications. Further, the fibre board materials can be used in any other composite suitable wood panel material, including wood-based panels used for the manufacture of wood products and furniture, such as chairs, tables, desks, shelves and shelving units, or even wall panels, ceiling panels, architectural panels, engineered panels, or the like.

As such, in a further aspect, the present invention also provides the use of the fiber board materials so produced by the method described hereinabove, as a core layer in a wood panel product, such as, for example, a laminate floor.

DETAILED DESCRIPTION OF THE INVENTION

The following diagram describes the reaction of a process to prepare a typical polyurethane resin:

where R and R' are used to designate any of a variety of suitable alkyl or aromatic groups.

Depending upon the type of structure that is required by a specific application, the resin system may have a low molecular weight which promotes the formation of a more rigid composite material. However, to achieve a resilient, semi-rigid composite material, a medium molecular weight resin system is more preferred. To achieve a more flexible, resilient composite, a high molecular weight resin system would preferably be used. As such, the desired hardness, strength and flexibility of the resin system can be, to a large extent, controlled by selection of a resin having an appropriate molecular weight. However, the resulting fiber board material must be resilient.

A low molecular weight resin preferably contain from 20 to 30% isocyanate content. Medium molecular weight resin systems preferably contain from 8 to 20% isocyanate content. High molecular weight resin systems preferably contain from 2 to 8% isocyanate content. All percentage values are by weight unless otherwise stated.

The polyol portion of the polyurethane can be any suitable polyol commonly used within the art, and can include aliphatic or aromatic polyols, including polyester, polyether, and caprolactone-based polyols. The polyols include materials such as glycerol, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5,1,2,6-hexanetriol, 1,1,1,-trimethylolpropane, or the like, or can be made by any suitable production method which would typically and preferably involve reacting ethylene oxide (EO), propylene oxide (PO) or butylene oxide (BO) with materials such as: 1,1,1-tris[(2-hydroxyethoxy)methyl]ethane, 1,1,1,-tris-[(2-hydroxypropoxy)methyl]propane, triethanolamine, triisopropanolamine, pyrogallol or phloroglucinol, in order to form a chain-extended polyol.

One example of a suitable chain-extended polyol is the polyether triol sold under the trade name XD 1421, which is made by the Dow Chemical Company. It has a molecular weight of around 4900, and is composed of a ratio of three oxyethylene (ethylene oxide) units randomly copolymerized per one unit of oxypropylene (propylene oxide). It has a hydroxy content of 0.61 meq. OH/g. Another example of a material which is commercially available is Pluracol V-7 made by BASF Wyandotte which is a high molecular weight liquid polyoxyalkylene polyol. Other polyols which might be used at polyether polyols such as Pluracol 492 from BASF, having a molecular weight of 2000. Alternatively, saturated polyester polyols such as Desmophen 2500 from Bayer, having a molecular weight of 1000 might be used. Further, castor oils such as DB castor oil or regular commercial grades of castor oil available from for example, CAS Chem, might also be used. Additionally, polybutadiene resins, such as Poly BD R45T, available from Sartomer, can be used. However, a wide variety of polyols might be used. Further, combinations of various polyols, or types of polyols, or mixtures thereof and therebetween, might also be used. A preferred blend is a blend of a polyol and castor oil.

The preferably chain extended polyol can be capped with a polyisocyanate to form a pre-polymer.

In general, the isocyanate component of the polyisocyanate preferably has a functionality of 2.0 or more, and more preferably, a functionality of between 2.0 and 3.0, and can include diisocyanates and polyisocyanates of the aliphatic, alicyclic, or aromatic types.

The amount and type of isocyanate monomer used, or used in the production of the isocyanate component will directly affect the level of isocyanate groups present. For example, hexamethylene diisocyante (HDI), has a monomeric level of isocyanate of 50% NCO. Other materials will have different monomeric NCO levels, such as, for example, Bis-(4-Isocyanatocyclohexyl)methanes (H12MDI) at 31.8% NCO; isophorone diisocyanate (IPDI) at 37.5% NCO; toluene diisocyanate (TDI) at 48% NCO; or methyl diphenyl diisocyanate (MDI) at 28-34% NCO. When reacted to form the isocyanate prepolymer component, the monomeric NCO level will affect the isocyanate level of the resulting prepolymer material.

The isocyanate is preferably a isocyanate selected from MDI, TDI, hexamethylene diisocyanate (HMDI), HDI, IPDI, TMXDI (1,3-bis-isocyanato-1-methylene ethylene benzene), or any of their oligomers, pre-polymers, dimmers, trimers, allophanates and uretidiones.

Further, suitable polyisocyanates useful in preparing the pre-polymer include, but are not limited to, toluene-2,4-diisocyanate, toluene-2,6-diisocyanatecommercial mixtures of toluene-2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4, 4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 4,4'-methylene bis(diphenyl)socyanate), 4,4'-methylene bis(dicyclohexylisocyanate), isophorone diisocyanate, PAPI (a polymeric diphenylmethane diisocyanate, or polyaryl polyisocyanate), 1,4-anthracenediisocyanate, 2,5-fluorenediisocyanate, 1,8-naphthalenediisocyanate and 2,6-diisocyanatobenzfuran.

Also suitable are aliphatic polyisocyanates such as the triisocyanate Desmodur N-100 sold by Bayer which is a biuret adduct of hexamethylenediisocyanate; the diisocyanate Hylene W sold by du Pont, which is 4,4'-dicyclohexylmethane diisocyanate; the diisocyanate IPDI (Isophorone Diisocyanate sold by Thorson Chemical Corp.), which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

Further examples of suitable isocyanate components include 2,4-tolylenediisocyanate, 2,6-tolylenediisocyanate, 4,4'-diphenylmethanediisocyanate, 4,4'-diphenylthere-diisocyanate, m-phenylenediisocyanate, 1,5-naphthalene-diisocyanate, biphenylenediisocyanate, 3,3'-dimethyl-4,4' biphenylenediisocyanate, dicyclohexylmethane-4,4' diisocyanate, p-xylylenediisocyanate, bis(4-isocyanatophynyl) sulfone, isopropylidene bis(4-phenylisocyanate), tetramethylene diisocyanate, isophorone diisocyanate, ethylene diisocyanate, trimethylene, propylene-1,2-diisocyanate, ethylidene diisocyanate, cyclopentylene-1,3-diisocyanates, 1,2-, 1,3- or 1,4 cyclohexylene diisocyanates, 1,3- or 1,4-phenylene diisocyanates, polymethylene ployphenylleisocyanates, bis(4-isocyanatophenyl)methane, 4,4'-diphenylpropane diisocyanates, bis(2-isocyanatoethyl) carbonate, 1-methyl-2,4-diisocyanatocycloheane, chlorophenylene diisocyanates, triphenylmethane-4,4'4"-triisocyanate, isopropyl benzene-a-4-diisocyanate, 5,6-diisocnanatobutylbicyclo[2.2.1]hept-2ene, hexahydrotolylene diisocyanate, 1-methoxyphenyl-2, 4-diisocyanate, 4,4'4"-triphenylmethane triisocyanate, polymethylene polyohenylisocyanate, tolylene-2,4,6-triisocyanate, 4,4'-dimethyldiphenylmethane-2,2'5,5'-tetraisocyanate, and mixtures thereof.

The production of MDF, HDF or particleboard fiber boards is described in the prior art, and will not be discussed in detail in this document. However, the amount of the binder composition, or resin system, used in the practice of the present invention, is preferably in an amount of from 2 to 50% by weight, and more preferably in an amount of from 7 to 40% by weight. Most preferably, the resin system is used in an amount of from 15 to 35% by weight. In each case, the percentage values are based on the weight of the composition including the wood particles or fibers.

The ratio of isocyanate to polyol has been previously discussed, but preferably, the ratio of resin system components is such that a semi-rigid, or more preferably, a resilient and flexible resin system is used.

The sound properties of the fiber board, as well as strength and flexibility of the fibre board can vary depending on the fibre used. Typically, a longer fibre, or a fibre from a softer wood, or other material, will provide a quieter floor panel.

The resiliency of the fibre board of the present application is that it will bend and deflect under localized pressure, such as under the weight of a pointed shoe heel, but not to the point where it will break the paper surface of the laminate floor. Additionally, once the localized pressure is removed, the fibre board will return to its previous configuration.

In contrast, rigid fiber boards of the prior art, tend to resist any deformation, and once deformed, do not return to the initial configuration. As such, the rigid fiber boards of the prior art resist any deformation, and when deformed, do not recover from the deformation. The resilient fiber boards of the present invention, deflect more easily, but restore themselves to their initial configuration once the deflecting force is removed.

The flexibility of the resultant fiber board is such that it permits at least some flexing over a 2 or 3 meter sheet of material. The fibre board can also be made so flexible that a 20 cm long sample can be bent essentially in half, but typically, this degree of flexibility is not desirable for use in wood panel or laminate flooring applications.

Preferably, the flexibility of 3 cm by 10 cm by 8 mm test sample will therefore be such that it will bend 5 mm or more without braking. More preferably, the same test sample will bend 1 cm, and even more preferably, 2 cm or more without breaking.

The resiliency of the same test panel, is preferably such that an applied pressure of 1000 g weight to the middle of a test sample supported at each end, will result in a deflection of more than 2 mm, and more preferably, more than 5 mm, and still more preferably, more than 1 cm. Further, after the weight is removed, the sample will return to its original position. In contrast, a rigid material would have little or no deflection.

Both the rigidity and flexibility of the fiber board are related to hardness. As such, the hardness of the test sample is preferably less than 80 (on the Shore "D" Hardness scale), and more preferably, less than 60. Even more preferably, the hardness of the fibre board will be 50 or less.

As such, the polyol and isocyanate are preferably formulated so that the resultant fiber board is resilient, and has a flexibility in a laminate floor which is greater than the flexibility of prior art, rigid laminate floors. In any case, the laminate flooring should be resilient, and optionally flexible, so that it will restore itself to its original configuration, once deformed.

However, it is to be noted that the present invention allows for the use of, or the additional use of, a broad range of reinforcing materials. The term "reinforcing materials" as used herein is intended to encompass a broad range of filler materials, which can be used in the production of a wide range of forms. A variety of particle sizes, shapes and densities of filler materials can be used, as well as combinations of various types of reinforcing agents.

The filler can be included with the fiber component, but preferably is mixed with one of the other components of the resin system in order to typically produce a high viscosity product which is capable of maintaining the suspension of the filler in place.

The dispersed filler particles which form the reinforcing agent are preferably at least partially chemically or physically bonded to the polymer matrix, although this is not required. This bonding can occur on the surface of the filler material, which may be the physical surface, or may extend to some depth below the surface at which depth the bonding and the filler materials are capable of bonding.

The reinforcing materials may be organic or inorganic in nature. Examples of suitable materials for the reinforcing material include rubber, glass, sand, crystalline powders, ceramic materials, milled carbon fiber, chopped glass, steel, synthetic particles or fibers, milled fibers, aramid based fibers, finely ground rubber, hollow or solid spheres, hollow glass spheres, solid glass spheres, natural fibres, protolignin-containing natural fibers such as wood flour, Portland cement, copper particles, aluminum particles, recycled thermoset materials, recycled plastic granules, thermoplastic granules, and mixtures thereof.

The reinforcing materials may also be supplemented by mineral fillers, wood flour, milled carbon fiber, milled aramid fiber, directional and non-direction structural fabrics, metallic plates, wood veneer, paper or the like, and mixtures thereof.

The reinforcing materials may also include any mixture or combination of the above named materials.

Preferably, the filler particles may range in size between 50 to 5,000 microns in diameter (including a combination of sizes). More preferably, the filler particle size range will vary between 100 to 1000 microns. There may also be a mixture of the sized particles in a typical composition.

The particles may also be in a range of shapes including regular and irregularly shaped crystals, regular and irregularly shaped fibers, regular and irregularly shaped spheres, regular and irregularly shaped granules, regular and irregularly shaped shavings, and other shapes.

In some cases, the reinforcing material is preferably treated to enhance surface bonding between the filler material and the pre-polymer matrix. The surface may thus be modified by the addition of known surface modifiers, such as silane, or polymer emulsion coatings.

Specifically, some reinforcing particles such as hollow glass spheres may be pre-coated with silane promoting a better chemical bond between the matrix resin and the particle. Hollow glass spheres also have a higher surface area than similarly-sized spherical particles thus providing for improved mechanical bonds.

Lightweight and voluminous reinforcing materials such as hollow glass spheres will typically represent a lower weight than the resin in a typical mixture. Reinforcing materials that have a high specific gravity such as crushed quartz will represent a higher weight than the resin in a typical mixture. The final composition will depend upon the desired end properties of the composite for a particular application.

Generally, the composite material will have the basic properties of the reinforcing material. For example, composite materials made with rubber particles will tend to have a flexible rubber surface comprising the particles chemically bonded in the pre-polymer resin matrix. It is also noted that certain materials, such as quartz particles in a variety of sizes can be used to make a composite that is hard, lightweight and fire-resistant at a low cost. As such, the reinforcing material can be selected to provide a composite material that is inherently fire resistant.

When used, the catalyst added to the system can be amine based, including, for example, primary, secondary or tertiary amines or combinations thereof. The catalysts can also be metallic based, including, for example, tin, lead, bismuth based catalysts, or the like. Catalysts can be used which promote the formation of urethane linkages in the polyurethane based systems, by reaction of isocyanate groups and hydroxyl groups.

These types of amine catalysts include, for example, triethylenediamine, N-methylmorpholine, tetramethyl-2,4-butanediamine, N-methylpiperazine, dimethylthanolamine, triethylamine, and the like; and organometallic compounds, such as stannous octanoate, dibutyltin dilaurate, dibutyltin di-2-ethylhexanoate, and the like. The catalysts may be used alone or in combination with one another. The amount of catalyst typically used is a broad range of amounts, which usually ranges from 0.03 to 2.0 parts by weight, and preferably between 0.02 to 1.2 parts by weight based on the total weight of the composition, exclusive of the reinforcing materials.

Other materials can be included in the formulations of the present invention. For example, coupling agents, such as silane or titanates, may also be included in the preparation of the composition to improve the physical properties of the material by binding the resin, and in particular, the urethane pre-polymer resin more efficiently to the reinforcing materials.

Where other properties are desired additives may be added to the composition including colorants, dry or liquid inks or pigments, fire and flame retardants, internal mold release additives, antistatic agents, and such other additives as required. The mixing of the composition requires an efficient shear mixer to homogeneously blend the reinforcing materials with the pre-polymer resin, surfactants, catalyst, blowing agent, colorants and other additives as required to make the composition material.

Prior to introducing the composition material into the forming tool, a release agent or coating in the form of a gel-coat system can be applied to the surface of the tool. The release agent or in-mold coating may comprise acrylic, urethane, melamine vinyl, silicone, epoxy, polyester coatings and combinations thereof to achieve the desired appearance and surface features.

Surface features such as a variety of textures may be applied to the tool surface to be molded into the final composite product.

EXAMPLES

Example VS1

Dry milled hardwood fibers (500 g) with an average diameter of 0.5 mm and a moisture content of 5% were used to produce the sample. A mixture of component A) (184 g) containing functional hydroxyl groups which are nonreactive at elevated temperature and comprising of a mixture of (54 g) of Castor oil and (130 g) of Polyol "A1" was first prepared.

Polyol "A1" is a commercially available polyol made by propoxylation and ethoxylation of glycerol, is free of oxyalkylene residues other than oxypropylene and oxyethylene, contains only primary and secondary aliphatically bound —OH groups, has a nominal —OH functionality of 3, has a number average —OH equivalent weight of 1603, a molecular weight of 4800, a hydroxyl number of 35, and is characterized by having a weight ratio of oxyethylene to oxypropylene residues of about 17:83. Polyol "A1" also has its oxyethylene units located predominantly at the chain ends, resulting in a polyol that is predominantly primary —OH terminated.

Component A) was then blended with a second component B) containing isocyanate functional groups (42 g) (MR Lite from Bayer), which are reactive at elevated temperature. The two components A) and B) were pre-mixed in a separate container and then added to the hardwood fibers in a mixer bowl at room temperature (26° C.), and the materials were blended for approximately 1 minute in a lab mixer fitted with a single oscillating mix blade. The resultant binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was flexible and exhibited a hardness of 45 on the Shore D scale. The hot board was placed on a wire cooling grill and subsequently cut up as appropriate and subjected to testing.

Example VS2

Dry milled hardwood fibers (500 g) with an average diameter of 0.5 mm and a moisture content of 5% were used to produce the sample. A blend of component A) containing functional hydroxyl groups (192 g) which are nonreactive at elevated temperature comprising of a mixture of (159 g) of a polyol (Polyol "A1") and (33 g) of Castor oil, and a second component B) containing isocyanate functional groups (35 g) (MR Lite from Bayer), which are reactive at elevated temperature, was prepared. The two components A) and B) were pre-mixed in a separate container and added to the hardwood fibers in a mixer bowl at room temperature (26° C.), and the materials were blended for approximately 1 minute in a lab mixer with a single oscillating mix blade. The binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was flexible and exhibited a hardness of 50 on the Shore D scale. The hot board was placed on a wire cooling grill and subsequently cut up as appropriate and subjected to testing.

Example VS3

Dry milled hardwood fibers (500 g) with an average diameter of 0.5 mm and a moisture content of 5% were used to produce the sample. A blend of component A) containing functional hydroxyl groups (168 g) which are nonreactive at elevated temperature comprising of a mixture of (92 g) of a polyol (Polyol "A1") and (76 g) of Castor oil, and the second component B) containing isocyanate functional groups (59 g) (MR Lite from Bayer), which are reactive at elevated temperature, was prepared. The two components A) and B) were pre-mixed in a separate container and added to the hardwood fibers in a mixer bowl at room temperature (26° C.), and the materials were blended for approximately 1 minute in a lab mixer with a single oscillating mix blade. The binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was flexible and exhibited a hardness of 45 on the Shore D scale. The hot board was placed on a wire cooling grill and subsequently cut up as appropriate and subjected to testing.

Example VS4

Dry milled hardwood fibers (500 g) with an average diameter of 0.5 mm and a moisture content of 5% were used to produce the sample. A blend of component A) containing functional hydroxyl groups (196 g) which are nonreactive at elevated temperature comprising of a mixture of (178 g) of a polyol (Polyol "A1") and (18 g) of Castor oil, and the second component B) containing isocyanate functional groups (29 g) (MR Lite from Bayer) which are reactive at elevated temperature, was prepared. The two components A) and B) were pre-mixed in a separate container and added to the hardwood fibers in a mixer bowl at room temperature 26° C., and the materials were blended for approximately 1 minute in a lab mixer with a single oscillating mix blade. The binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was flexible and exhibited a hardness of 45 on the Shore D scale. The hot board was placed on a wire cooling grill and subsequently cut up as appropriate and subjected to testing.

Example VS5

Dry milled hardwood fibers (500 g) with an average diameter of 0.5 mm and a moisture content of 5% were used to produce the sample. A blend of component A) containing functional hydroxyl groups (226 g) which are nonreactive at elevated temperature comprising of a mixture of (13 g) of a polyol (Polyol "A1") and (13 g) of Castor oil, and the second component B) containing isocyanate functional groups (200 g) (MR Lite from Bayer) which are reactive at elevated temperature, was prepared. The two components A) and B) were pre-mixed in a separate container and added to the hardwood fibers in a mixer bowl at room temperature (26° C.), and the materials were blended for approximately 1 minute in a lab mixer with a single oscillating mix blade. The binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was rigid and exhibited a hardness of 50 on the Shore D scale. The hot board was placed on a wire cooling grill and subsequently cut up as appropriate and subjected to testing.

Example VS6

Dry milled hardwood fibers (500 g) with an average diameter of 0.5 mm and a moisture content of 5% were used to produce the sample. A blend of component A) containing functional hydroxyl groups (204 g) which are nonreactive at elevated temperature comprising of a mixture of (200 g) of a polyol (Polyol "A1") and (4 g) of Castor oil, and the second component B) containing isocyanate functional groups (23 g) (MR Lite from Bayer) which are reactive at elevated temperature, was prepared. The two components A) and B) were pre-mixed in a separate container and added to the hardwood fibers in a mixer bowl at room temperature (26° C.), and the materials were blended for approximately 1 minute in a lab mixer with a single oscillating mix blade. The binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was flexible and exhibited a hardness of 30 on the Shore D scale. The hot board was placed on a wire cooling grill and subsequently cut up as appropriate and subjected to testing.

Example VS7

Dry milled hardwood fibers (500 g) with an average diameter of 0.5 mm and a moisture content of 5% were used to produce the sample. A blend of component A) containing functional hydroxyl groups (228 g) which are nonreactive at elevated temperature comprising of a mixture of (224 g) of a polyol (Polyol "A1") and (4 g) of Castor oil, and the second component B) containing isocyanate functional groups (23 g) (MR Lite from Bayer) which are reactive at elevated temperature, was prepared. The two components A) and B) were pre-mixed in a separate container and added to the hardwood fibers in a mixer bowl at room temperature 26° C., and the materials were blended for approximately 1 minute in a lab mixer with a single oscillating mix blade. The binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was highly flexible and exhibited a hardness of 30 on the Shore D scale. The hot board was placed on a wire cooling grill and subsequently cut up as appropriate and subjected to testing.

Example VS8

Dry milled hardwood fibers (500 g) with an average diameter of 0.5 mm and a moisture content of 5% were used to produce the sample. AR-208 resin developed by PURchem Systems, Inc. consisting of a single-component pre-polymer made from PMDI (Mondur M from Bayer) reacted with a saturated polyoxy propelene glycol containing functional hydroxyl groups with a finished N.C.O content of 8% was added to the hardwood fibers at a ratio of 10% resin to 90% wood fibers in a mixer bowl at room temperature 26° C., and the materials were blended for approximately 1 minute in a lab mixer with a single oscillating mix blade. The binder-coated fibers were sprinkled uniformly by hand into a 30×30 cm (L×W) frame and compacted in a platen press and pressed to the intended thickness of 8 mm at a pressure of up to 68 bar for 150 sec at 130° C. The resulting 8 mm thick sample panel was highly flexible and exhibited a hardness of 50 on the Shore D scale. The hot board was placed on a wire cooling grill and subsequently cut up as appropriate and subjected to testing.

VS8 was found to be more resistant to heat and pressure when impregnated papers were applied to the panel under heat and pressure.

The samples from examples VS1 to VS8 were tested for sound against a comparable sample of laminate floor material.

BRIEF DESCRIPTION OF THE DRAWINGS

The results of the sound comparisons of the examples against a comparable sample of laminate floor material, are shown in the accompanying drawings in which.

Figure 1:
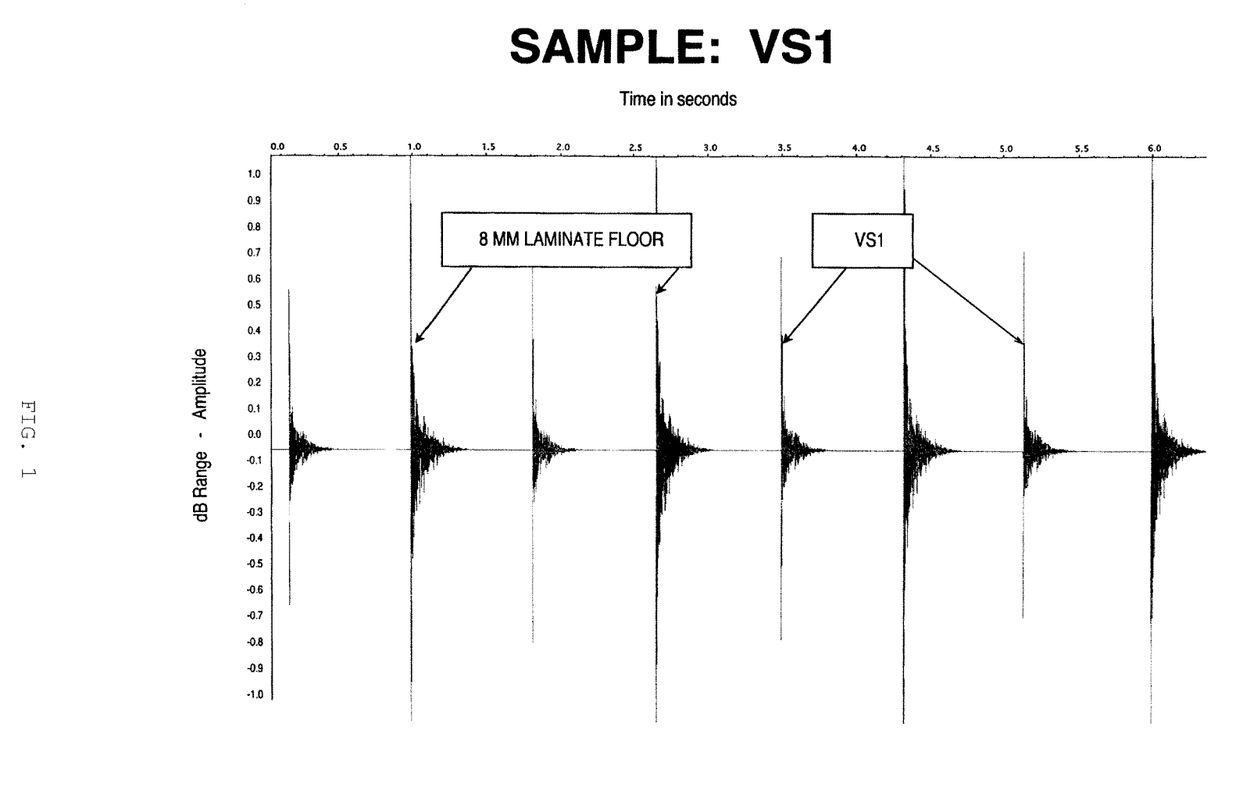
FIGS. 1 to 8 are sound recordings of impacts with the material of the examples, and with the laminate flooring material. The sound recordings were made using the program Audacity, on a Mac PowerBook. Individual samples VS1 through VS8 (FIGS. 1 to 8 respectively) were placed adjacent to a piece of 8 mm thick laminate floor directly in front of the computer. Both samples were placed on the same sheet of 2 mm thick foam laminate floor underlay material (typical of what would be used as underlay material in the industry).
Figure 2:
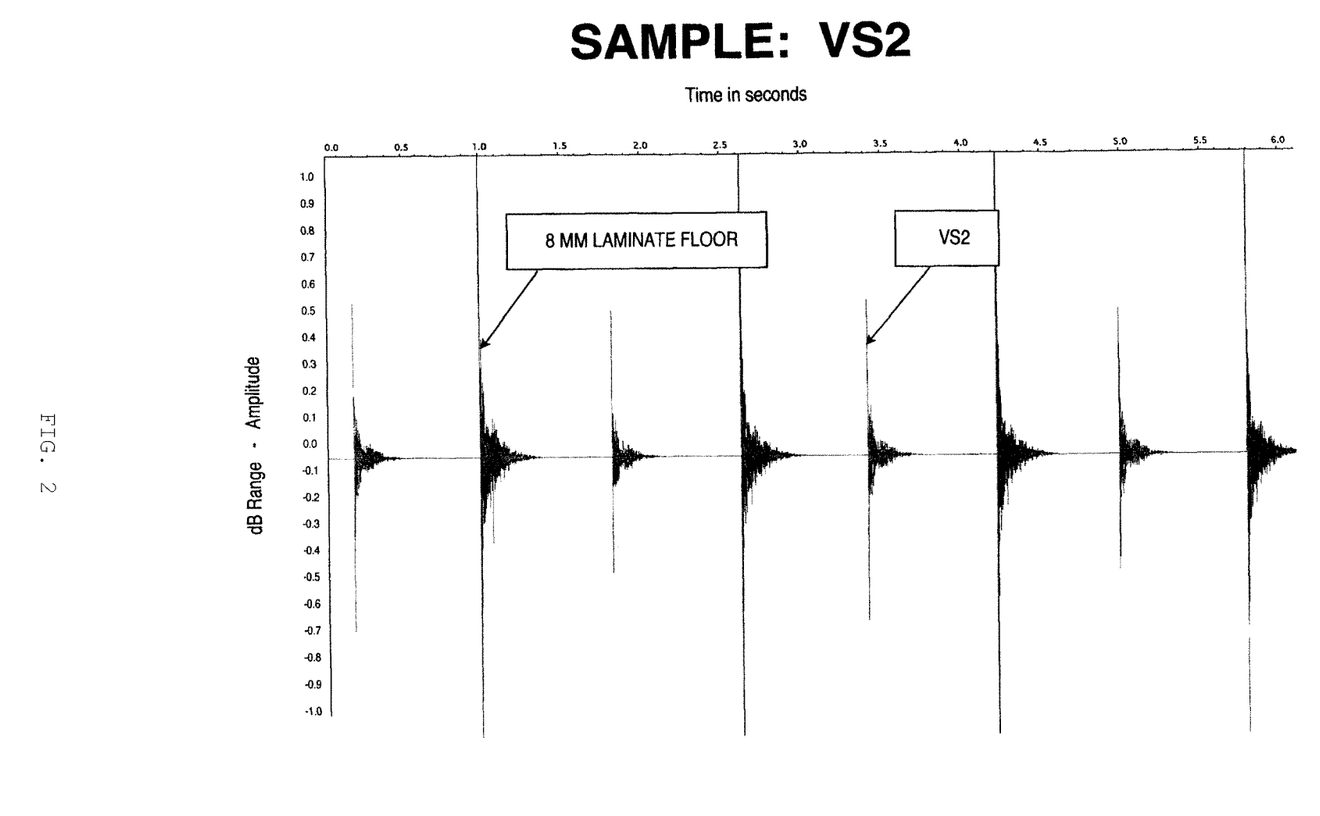
Figure 3:
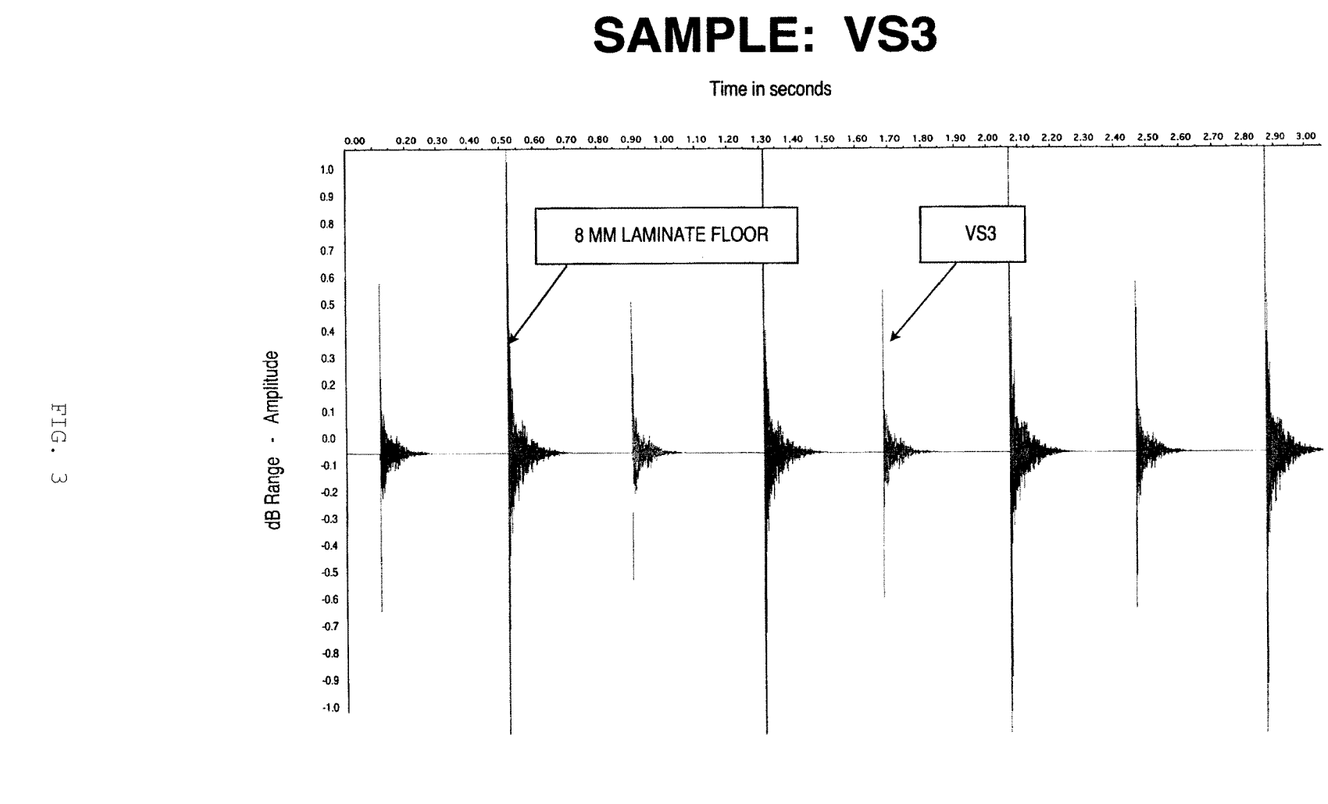
Figure 4:
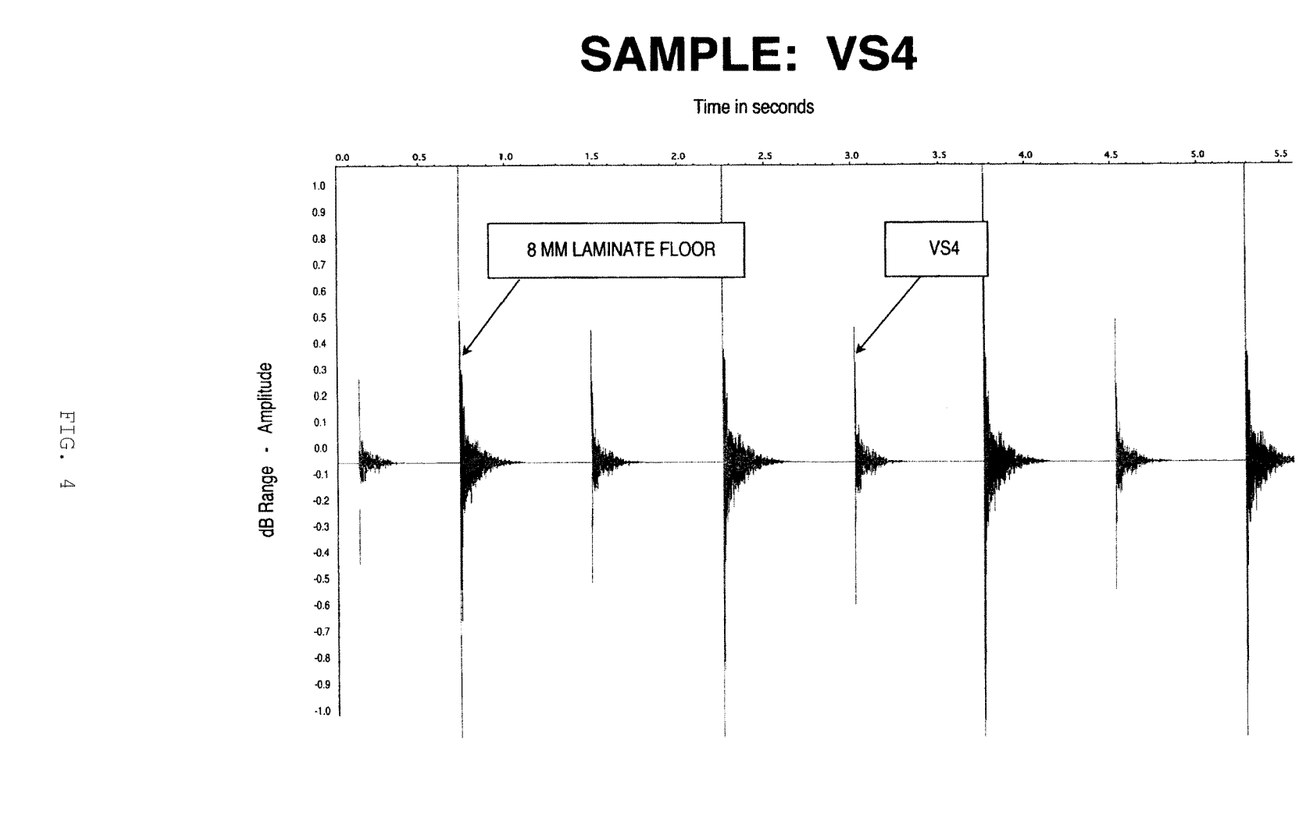
Figure 5:
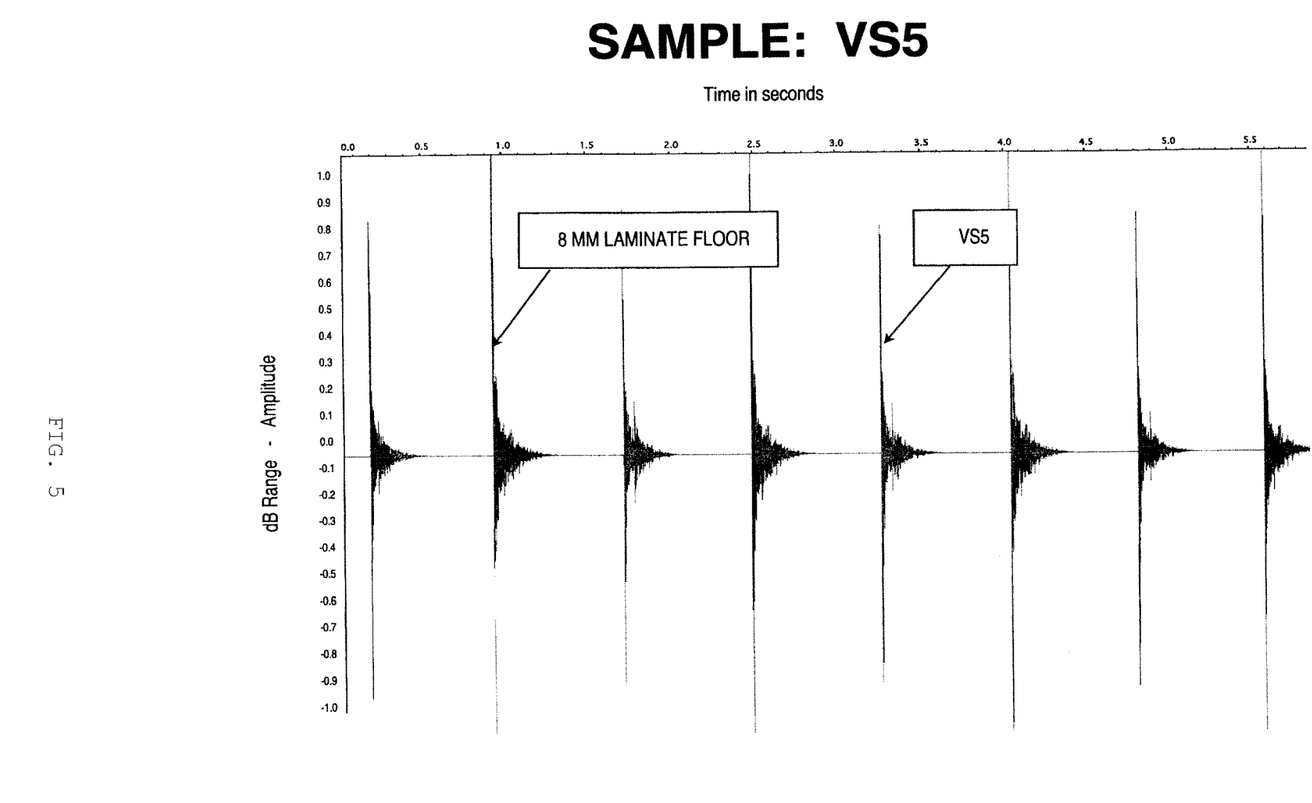
Figure 6:
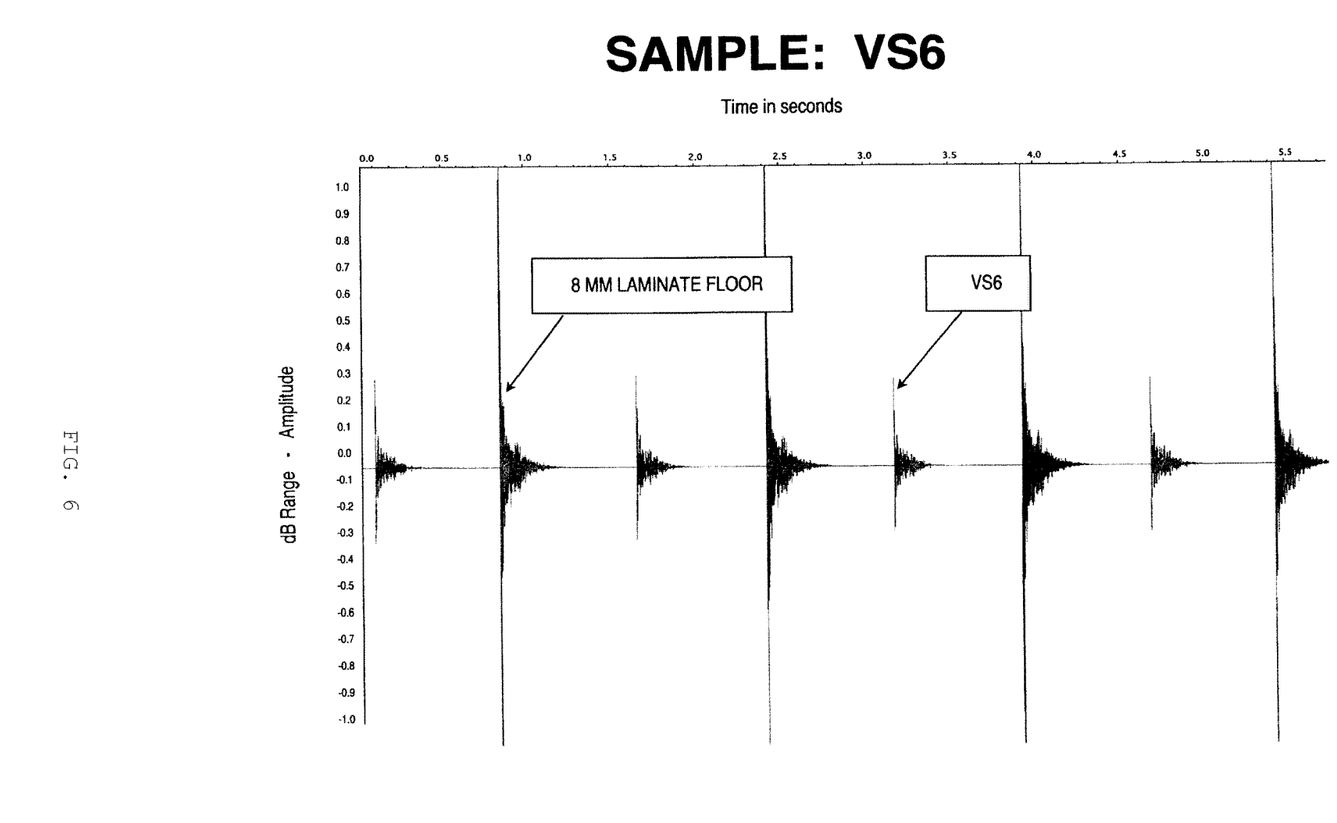
Figure 7:
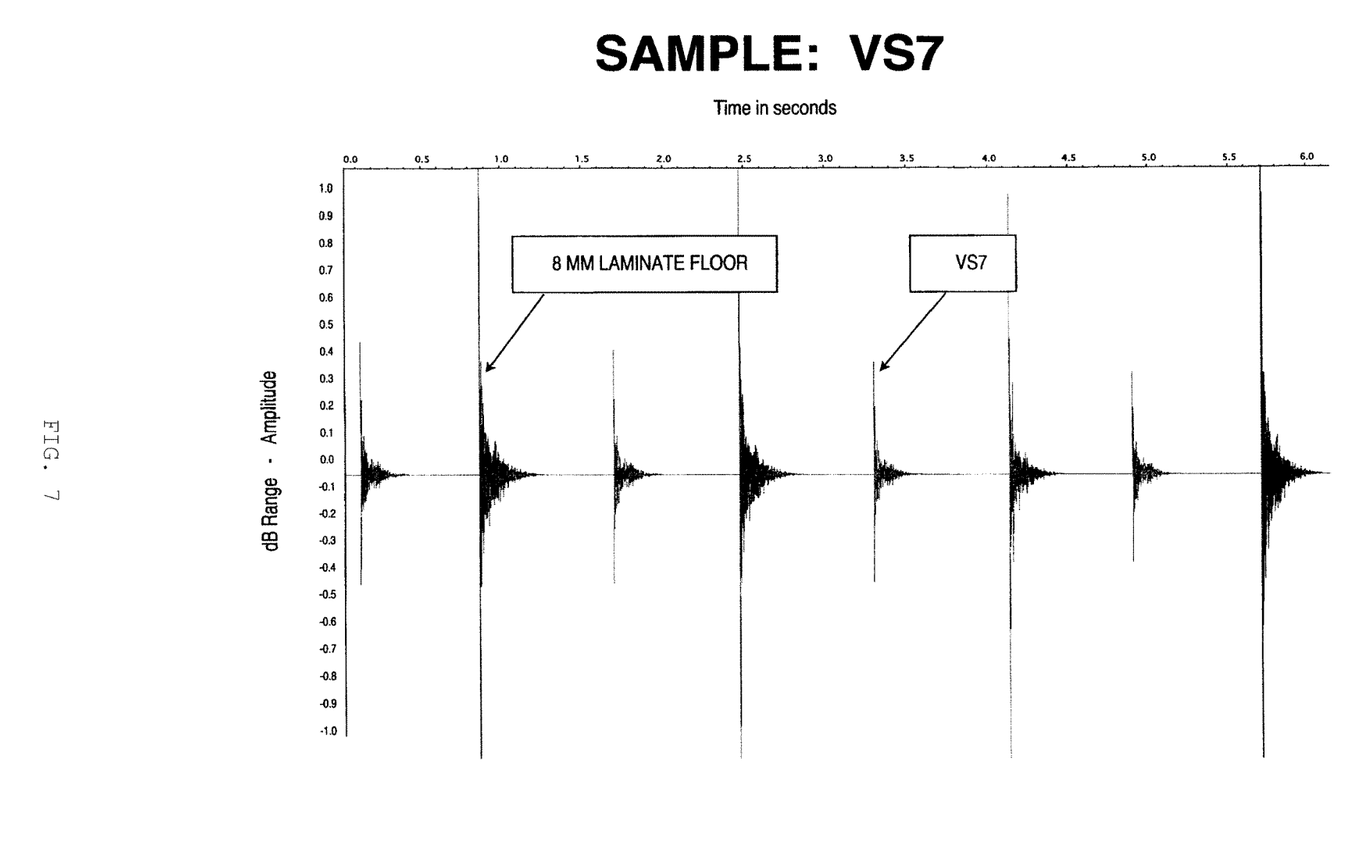
Figure 8:
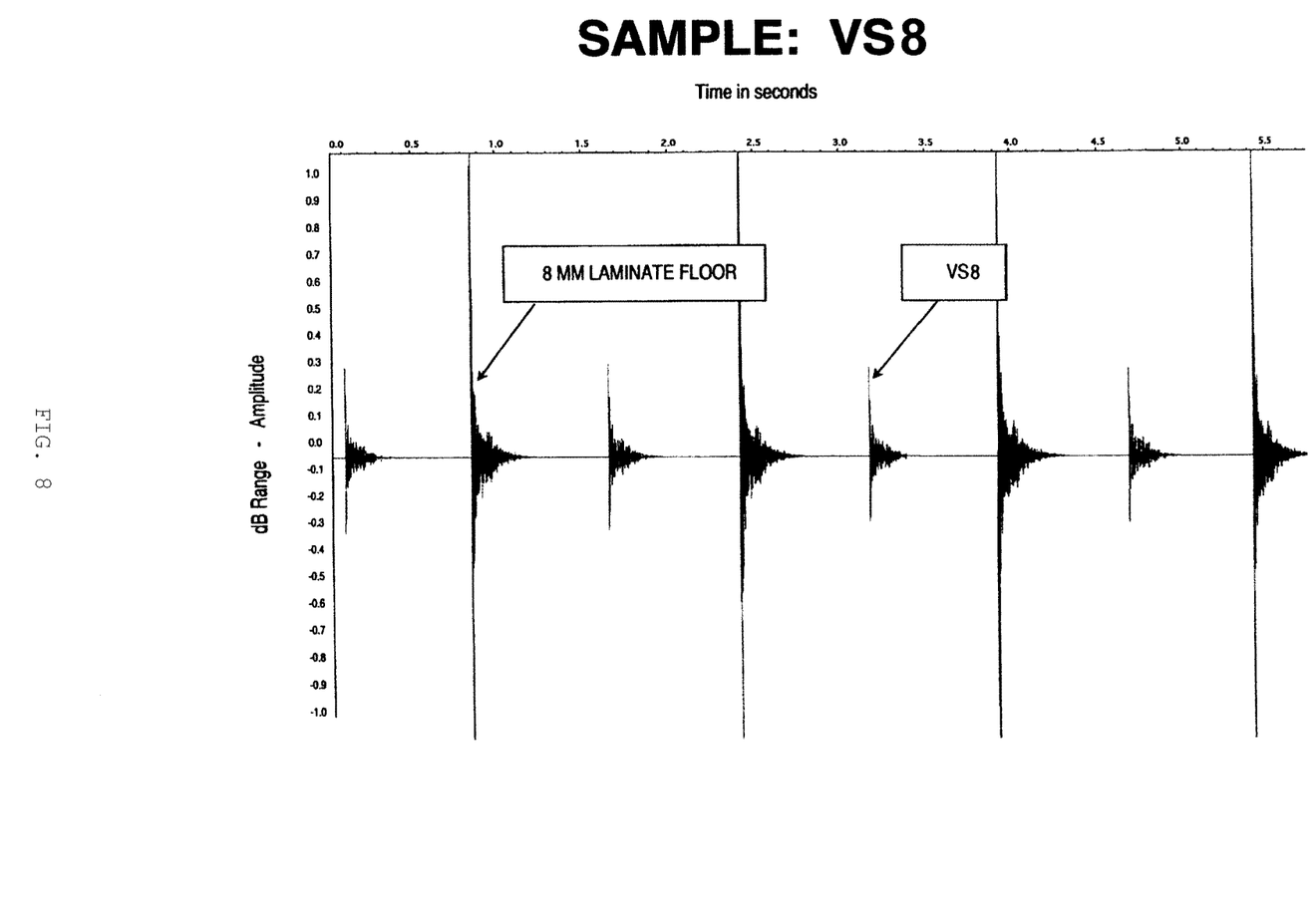

A plastic cylindrical object weighing 10 grams was dropped from a height of 2 cm repeatedly and alternatingly over each of the test sample materials, and the comparison laminate flooring material samples every 0.7 seconds (approximately) for a total of 10 to 15 seconds. A sampling of 8 drops (4 on each of the test material and the laminate floor material) was edited from the total.

Samples VS1, VS2, VS3, VS4, VS6, VS7 and VS8 were notably quieter than the comparative laminate flooring sample. Sample VS5 was the closest to the comparative laminate flooring sample, in sound generation.

Samples VS1 to VS8 ranged in resiliency and flexibility compared to the comparative laminate flooring sample, and the results are provided in Table 1. In Table 1, the resiliency of 3 cm by 10 cm by 0.8 cm sample was measured by supporting the sample at each end and applying a 1 kg weight to the center of the sample, and the ability to deflect and subsequently be restored to its original configuration is indicated wherein 0 is a rigid material exhibiting essentially no deflection, and 10 would be a deflection with little or no resistance. Also, the flexibility of the same samples was evaluated, wherein the ability of the same sample panel to bend, wherein 0 is bending less than 5 mm, without breaking, and 10 is bending 2.0 cm or greater without breaking. Both of these values are somewhat related to the hardness values observed. The level of sound for each floor material was compared with 0 being no sound, and 10 being the sound from the laminate floor sample.

TABLE 1

| Sample | Hardness (Shore D scale) | Resiliency | Flexibility | Sound |
| --- | --- | --- | --- | --- |
| Laminate floor | 80 | 0 | 0 | 10 |
| VS1 | 45 | 2 | 2 | 6 |
| VS2 | 50 | 1 | 1 | 5 |
| VS3 | 45 | 2 | 2 | 5 |
| VS4 | 45 | 2 | 2 | 4 |
| VS5 | 50 | 1 | 1 | 9 |
| VS6 | 30 | 4 | 4 | 3 |
| VS7 | 30 | 5 | 5 | 4 |
| VS8 | 50 | 5 | 5 | 3 |

Thus, it is apparent that there has been provided, in accordance with the present invention, a process for producing a wood fibre board which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Unless otherwise specifically noted, all of the features described herein may be combined with any of the above aspects, in any combination.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

We claim:

1. A process for the production of a resilient natural fiber MDF or HDF board comprising milling an admixture of natural fiber components at elevated temperature in a refiner unit, transferring the natural fiber components to a blowline, drying said natural fiber components, mixing said natural fiber components with a flexible resin binding system, and pressing said mixture under conditions of elevated pressure and elevated temperature in order to cause said resin binding system to react and produce a resilient MDF or HDF board, wherein said flexible resin binding system comprises from 7 to 40%, by weight, of a polyurethane-based resin comprising a mixture of:

an isocyanate selected from MDI, PMDI, TDI, hexamethylene diisocyanate (HMDI), HDI, IPDI, TMXDI (1,3-bis-isocyanato-1-methylene ethylene benzene), or any of their oligomers, pre-polymers, dimmers, trimers, allophanates and uretidiones; and a polyol selected from:

glycerol, 3-(2-hydroxyethoxy)-1,2 propanediol, 3-(2-hydroxypropoxy)-1,2-propanediol, 2,4-dimethyl-2-(2-hydroxyethoxy)-methylpentanediol-1,5, 1,2,6-hexanetriol, and 1,1,1,-trimethylolpropane; or a reaction product of ethylene oxide (EO), propylene oxide (PO) or utylenes oxide (BO) with 1,1,1-tris [(2-hydroxyethoxy)methyl]ethane, 1,1,-tris-[(2-hydroxypropoxy)methyl]propane, triethanolamine, triisopropanolamine, pyrogallol or phloroglucinol, in order to form a chain extended polyol; and wherein said resilient natural fiber MDF or HDF board has a hardness of less than 80 on the Shore "D" hardness scale, and a flexibility such that a 3 cm by 10 cm by 8 mm test sample will bend 1 cm without breaking.

2. A process as claimed in claim 1 wherein said polyol material additionally comprises castor oil.

3. A process as claimed in claim 1 wherein the amount of the flexible resin binding system in the natural fiber, MDF or HDF board is in an amount of from 15 to 35% by weight.

4. A composite wood panel material comprising a core layer, wherein said core layer is a resilient natural fiber, MDF or HDF board produced by a process as claimed in claim 1.

5. A composite wood panel material as claimed in claim 4 where said composite wood panel material is used in the manufacture of chairs, tables, desks, shelves and shelving units, wall panels, ceiling panels, architectural panels, or engineered panels.

6. A process as claimed in claim 1 wherein said resilient natural fiber MDF or HDF board has a hardness of less than 50 on the Shore "D" hardness scale, and a flexibility such that a 3 cm by 10 cm by 8 mm test sample will bend 2 cm without breaking.

7. A resilient natural fiber MDF or HDF board comprising an admixture of natural fiber components and a flexible resin binding system, wherein said flexible resin binding system comprises from 7 to 40%, by weight, of a polyurethane-based resin comprising a mixture of:
- an isocyanate selected from MDI, PMDI, TDI, hexamethylene diisocyanate (HMDI), HDI, IPDI, TMXDI (1,3-bis-isocyanato-1-methylene ethylene benzene), or any of their oligomers, pre-polymers, dimmers, trimers, allophanates and uretidiones; and
- a polyol selected from:
  - glycerol, 3-(2-hydroxyethoxy)-1,2 propanediol, 3-(2-hydroxypropoxy)-1,2-propanediol, 2,4-dimethyl-2-(2-hydroxyethoxy)-methylpentanediol-1,5, 1,2,6-hexanetriol, and 1,1,1,-trimethylolpropane; or
  - a reaction product of ethylene oxide (EO), propylene oxide (PO) or utylenes oxide (BO) with 1,1,1-tris [(2-hydroxyethoxy)methyl]ethane, 1,1,-tris-[(2-hydroxypropoxy)methyl]propane, triethanolamine, tri-isopropanolamine, pyrogallol or phloroglucinol, in order to form a chain extended polyol; and
- wherein said resilient natural fiber MDF or HDF board has a hardness of less than 80 on the Shore "D" hardness scale, and a flexibility such that a 3 cm by 10 cm by 8 mm test sample will bend 1 cm without breaking.

\* \* \* \* \*